United States Patent
Wilburn, Sr. et al.

(10) Patent No.: US 12,041,423 B2
(45) Date of Patent: Jul. 16, 2024

(54) INGRESS PROTECTION FROM FOREIGN MATERIAL IN HEARING INSTRUMENTS

(71) Applicant: Starkey Laboratories, Inc., Eden Prairie, MN (US)

(72) Inventors: Timothy Brent Wilburn, Sr., Mendota Heights, MN (US); Thomas Howard Burns, Minneapolis, MN (US); Westley G. Gentry, Buffalo, MN (US); Kent Williamson, Watertown, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 149 days.

(21) Appl. No.: 17/701,381

(22) Filed: Mar. 22, 2022

(65) Prior Publication Data
US 2022/0217484 A1    Jul. 7, 2022

Related U.S. Application Data

(63) Continuation of application No. PCT/US2020/052290, filed on Sep. 23, 2020.
(Continued)

(51) Int. Cl.
*H04R 25/00* (2006.01)
*C09D 5/00* (2006.01)
(Continued)

(52) U.S. Cl.
CPC ............ *H04R 25/609* (2019.05); *C09D 5/00* (2013.01); *C09D 7/61* (2018.01); *C09D 133/16* (2013.01);
(Continued)

(58) Field of Classification Search
CPC ................ H04R 25/609; H04R 25/604; H04R 25/658; H04R 2225/021
See application file for complete search history.

(56) References Cited

U.S. PATENT DOCUMENTS

| 7,872,195 B1 | 1/2011 | Low et al. |
| 8,071,160 B2 | 12/2011 | Chinn et al. |

(Continued)

FOREIGN PATENT DOCUMENTS

EP    2348757 A1    7/2011

OTHER PUBLICATIONS

"Colloidal Magnetic Silica Nano-/Microspheres", Alpha Nanotech, Retrieved from: https://www.alphananotechne.com/magnetic-silica-microspheres?gclid=EAlalQobChMlv6y1l5j24wIVCbvsCh0HTQ7_EAAYASAAEgLqPvD_BWE, Accessed on: Jun. 16, 2022, 6 pp.
Amirzehni et al. "Experimental study of magnetic field effect on bubble lift-off diameter in sub-cooled flow boiling", Experimental Thermal and Fluid Science, vol. 89, Dec. 2017, pp. 62-71.

(Continued)

*Primary Examiner* — Suhan Ni
(74) *Attorney, Agent, or Firm* — Mueting Raasch Group

(57) ABSTRACT

Examples of hearing assistance devices are described. The hearing assistance devices include an enclosing structure configured to house a receiver that generates sound waves into an ear canal of a user when the hearing assistance device is worn, and a tube coupled to the receiver to direct the sound waves into the ear canal of the user. The tube may include magnetized particles that form a magnetic field through the tube. The tube may include a portion of hydrophilic coating and a portion of hydrophobic coating. The hearing assistance device may include a coiled wire configured to carry an alternating current to generate an electromagnetic field through the tube.

17 Claims, 9 Drawing Sheets

Related U.S. Application Data

(60) Provisional application No. 62/907,276, filed on Sep. 27, 2019, provisional application No. 62/941,250, filed on Nov. 27, 2019.

(51) Int. Cl.
  *C09D 7/61* (2018.01)
  *C09D 133/16* (2006.01)
  *C09D 177/00* (2006.01)

(52) U.S. Cl.
  CPC ......... *C09D 177/00* (2013.01); *H04R 25/604* (2013.01); *H04R 25/658* (2013.01); *H04R 2225/021* (2013.01)

(56) References Cited

U.S. PATENT DOCUMENTS

| | | | |
|---|---|---|---|
| 8,135,149 | B2 | 3/2012 | Yoshida |
| 8,638,186 | B1 | 1/2014 | Lapoint |
| 9,451,354 | B2 | 9/2016 | Zadesky et al. |
| 2005/0117713 | A1 | 6/2005 | Waldron et al. |
| 2013/0125387 | A1* | 5/2013 | Wenzel ............... H04R 25/602 29/418 |
| 2013/0130097 | A1* | 5/2013 | Wenzel ............... H01M 50/102 429/176 |
| 2014/0083296 | A1 | 3/2014 | Sanders |
| 2017/0127163 | A1 | 5/2017 | Weber et al. |
| 2017/0127199 | A1* | 5/2017 | Marxen ............... H04R 25/652 |
| 2019/0268706 | A1 | 8/2019 | Solum et al. |

OTHER PUBLICATIONS

Chaplin, "Magnetic and Electric Effects on Water", Water Structure and Science, Feb. 1, 2019, 6 pp.
Davis, "Magnet and Water.MPG", YouTube, Apr. 20, 2010, 7 pp, available at: https://www.youtube.com/watch?v=NFq-Fq_msL8.
Fujimura et al., "Magnetic Field Increases the Surface Tension of Water", Journal of Physics Conference Series, vol. 156, May 2009, 5 pp.
International Preliminary Report on Patentability from International Application No. PCT/US2020/052290 dated Mar. 15, 2022, 12 pp.
International Search Report and Written Opinion of International Application No. PCT/US2020/052290 dated Jan. 15, 2021, 19 pp.
Li et al., "Effect of a magnetic field on dendritic morphology in Al—Cu hypoeutectic alloy", IOP Conference Series: Materials Science and Engineering, vol. 27, Jun. 7-10, 2011, 6 pp.
Monroe, "Water Molecules, Unite!" Phys. Rev. Focus 19, Jun. 18, 2007, 3 pp.
Sharma et al., "Dipolar Correlations and the Dielectric Permittivity of Water", Physical Review Letters, Jun. 13, 2007, 4 pp.
Starr, "We Now Have The First-Ever Permanently Magnetic Liquid, And It's Absolutely Trippy", Science Alert, Jul. 19, 2019.
Takahashi et al., "Structure of Liquid Surface and Mechanics of Surface Tension", Japanese Journal of Applied Physics, vol. 22, No. 1R, 1983, pp. 17-22. (Applicant points out, in accordance with MPEP 609.04(a), that the year of publication, 1983, is sufficiently earlier than the effective U.S. filing date, so that the particular month of publication is not in issue.).
Wang et al., "Study on the surface tensions of MDEA-methanol aqueous solutions", IOP Conference Series: Earth and Environmental Science, vol. 59, No. 1, Mar. 2017, 4 pp.
Zhou et al., "Growth of subscale on Fe—20Ni binary alloy in the presence of magnetic field", Corrosion Science, vol. 77, Dec. 2013, pp. 292-296.

\* cited by examiner

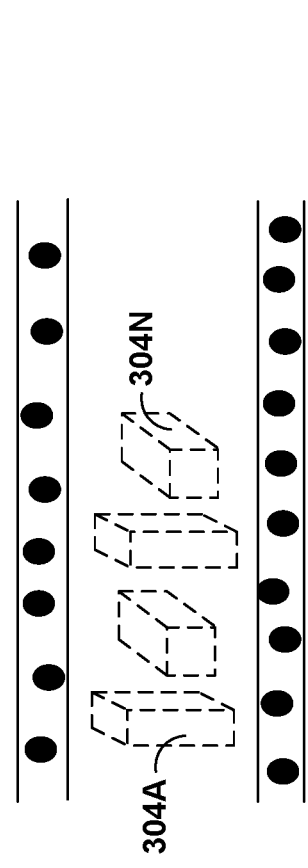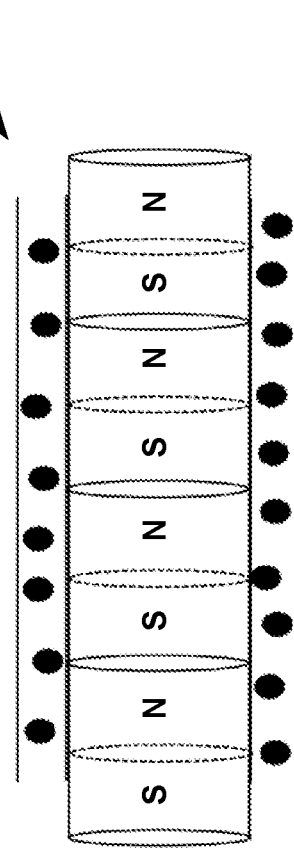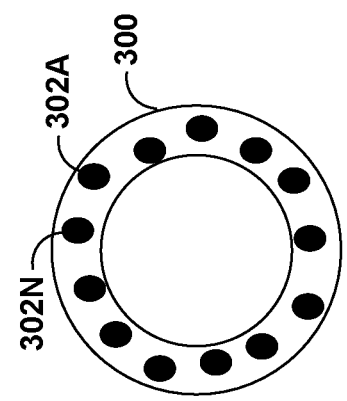
FIG. 3B
FIG. 3C
FIG. 3A

INGRESS PROTECTION FROM FOREIGN MATERIAL IN HEARING INSTRUMENTS

RELATED APPLICATION

This application is a continuation of International Application No. PCT/US2020/052290, filed Sep. 23, 2020, which claims the benefit of U.S. Provisional Application No. 62/907,276 filed Sep. 27, 2019 and U.S. Provisional Application No. 62/941,250 filed Nov. 27, 2019, the contents of each of which are incorporated by reference in their entirety.

TECHNICAL FIELD

This disclosure relates to hearing assistance devices such as hearing aids, wireless ear-buds, head-sets, and other devices for hearing sound.

BACKGROUND

Hearing assistance devices (also commonly referred to as "hearing aids" and "hearing instruments") include tubes or other apertures through which foreign material enters hearing assistance devices. The foreign material, such as water, sweat, wax, and the like, can negatively impact the operation of the hearing assistance devices.

SUMMARY

In one example, the disclosure describes a hearing assistance device comprising an enclosing structure configured to house a receiver that generates sound waves into an ear canal of a user when the hearing assistance device is worn, and a tube coupled to the receiver to direct the sound waves into the ear canal of the user, wherein the tube comprises magnetized particles that form a magnetic field through the tube.

In one example, the disclosure describes a hearing assistance device comprising an enclosing structure configured to house a receiver that generates sound waves into an ear canal of a user when the hearing assistance device is worn, and a tube coupled to the receiver to direct the sound waves into the ear canal of the user, wherein the tube comprises a portion of hydrophilic coating and a portion of hydrophobic coating.

In one example, the disclosure describes a hearing assistance device comprising an enclosing structure configured to house a receiver that generates sound waves into an ear canal of a user when the hearing assistance device is worn, a tube coupled to the receiver to direct the sound waves into the ear canal of the user, and a coiled wire configured to carry an alternating current to generate an electro-magnetic field through the tube.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 3A-3D are conceptual diagrams illustrating different perspectives of a tube of a hearing assistance device having magnetized particles.

DETAILED DESCRIPTION

Figure 1A:
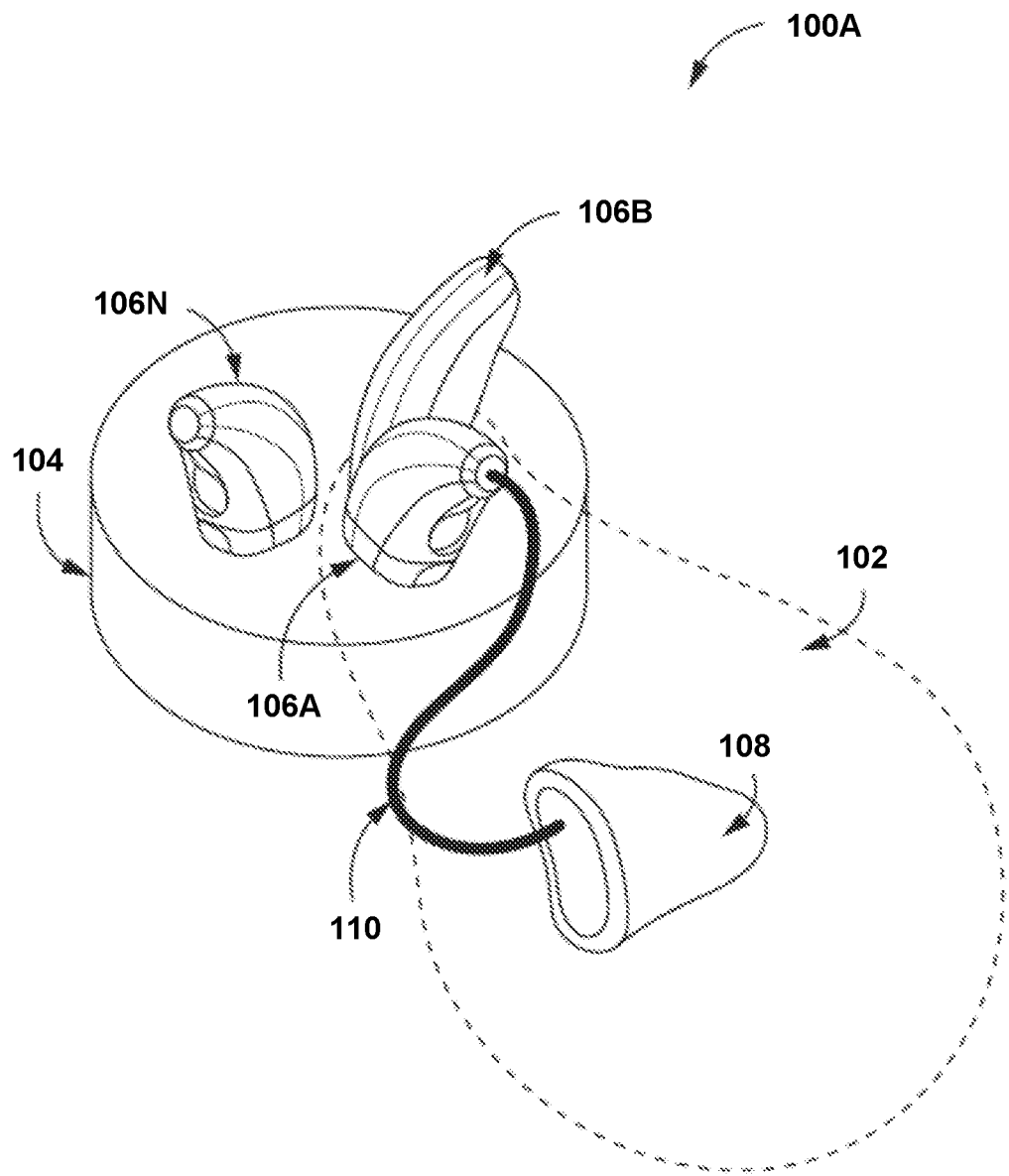
FIGS. 1A through 1D are conceptual diagrams illustrating an example hearing assistance system, in accordance with one or more aspects of the present disclosure.

This disclosure relates to example techniques to protect hearing assistance devices from ingress of foreign material. For example, sweat from the user may enter through an aperture in the hearing assistance device. As another example, water from showering or swimming may enter through an aperture in the hearing assistance device. As yet another example, earwax build-up may enter through an aperture in the hearing assistance device.

A user may periodically clean the hearing assistance device. However, if the user fails with upkeep of the hearing assistance device, the foreign material may impede the operation of the hearing assistance device. For example, in a behind-the-ear (BTE) hearing aid, a behind-the-ear portion and an in-the-ear portion are coupled to one another via an acoustical conduit in the form of a tube, which may be hollow. Foreign material that enters through the tube may reach a transducer of the in-the-ear portion and cause the transducer to malfunction.

The disclosure describes example ways in which to limit the ingress of such foreign materials into the hearing assistance device, and in some examples, ways in which to push out the foreign material. A commonality between example foreign materials may be the existence of water. The example techniques described in this disclosure leverage the chemical properties of water as a way to change properties of the foreign material and slow down the ingress of the foreign material, including examples of expelling the foreign material from the hearing assistance device. For example, some existing techniques to slow down the ingress of foreign material or expel the foreign material from the hearing assistance device are not based on the chemical properties of water, such as in cerumen or sweat, that can be leveraged to slow down the ingress of or expel the foreign material, like cerumen or sweat.

As one example, a water molecule is a dipole molecule where the two oxygen-hydrogen bonds are oriented at an angle of approximately 104.5° with a dipole moment of 1.84 debyes (D). The dipolar nature of water allows its bulk properties to be influenced by electric and magnetic fields. Furthermore, sodium chloride and potassium chloride, two compounds contained in human cerumen within the ear canal, have dipole moments of 9.0 D and 10.2 D, respectively, which can also be influenced by electric and magnetic fields. There may be additional examples of foreign material.

As one example, water tends to flow through a path with lower magnetic field levels due to the diamagnetic property of water. Accordingly, in the presence of a magnetic field, the flow of water can slow down. In some examples, a tube of the hearing assistance device is formed with magnetic microspheres interspersed in the tube material. The magnetic microspheres have properties where, if an external magnetic field is applied to the oxide material, the magnetic microspheres are magnetized, and then once the external magnetic field is removed, the magnetic microspheres remain magnetized. Examples of magnetic microspheres include colloidal magnetic silica microspheres. In some examples, the tube may be formed with permanent magnets interspersed in the tube material. In some examples, recently formed magnetic liquid may be interspersed in the tube material. Other ways in which to include magnetized material in the tube are possible, and the techniques are not limited to the above examples. For instance, in some examples, the magnetized material may be within a coating that is cured on the tube, in addition to or instead of the magnetized material being formed in the tube material. Because the foreign material tends to include water, having a magnetic field emanating from the magnetic materials in the tube may reduce the rate of ingress of the foreign material.

Although water may flow through paths having lower magnetic field, water may still enter the magnetic field. Also, in some examples, there may not be magnetized material in the tube. In some examples, including examples where there is magnetized material in the tube and excluding examples where there is magnetized material in the tube, an electro-magnetic field source may be used to apply an electro-magnetic field to the foreign material.

When water is exposed to electro-magnetic fields, the dipole nature of the water causes the water molecules to align in a certain configuration. When aligned in the certain configuration, in response to being exposed to the electro-magnetic fields, the cohesive forces of the water molecules, and therefore, the cohesive forces of the foreign material are altered with the goal of containing the material to local regions, thereby inhibiting its ability to ingress onto critical electromechanical components such as acoustic transducers.

A hearing assistance device, in accordance with one or more examples described in this disclosure, may be configured with an electro-magnetic field source. The electro-magnetic field source outputs an electro-magnetic field that causes the water molecules of the foreign material to orient in a manner that lowers the cohesive force of the foreign material.

In some examples, an internal energy source may output energy that pushes out the foreign material out of the hearing assistance device, or at least impedes the movement of the foreign material towards the hearing assistance device. As one example, a hearing assistance device includes an acoustic source (e.g., internal energy source) that is configured to generate an acoustic wave having a frequency outside of human hearing range that gently and slowly pushes the foreign material outwards. As another example, a vibrating source is an example of the internal energy source, and the vibrating source causes the tube to vibrate and gently dislodge the foreign material.

Due to power constraints and that the hearing assistance device is in the ear, in one or more examples, the techniques may be related to low energy usage such that the foreign material is gently moved or dislodged. Furthermore, low energy techniques may ensure no negative impact to the user such as impact on hearing.

Moreover, the example hearing assistance devices may be configured with additional materials to protect against the ingress of foreign materials. As one example, portions of a hearing assistance device may be engineered with a certain texture or coated in a hydrophobic material to repel water molecules, and portions of the hearing assistance device may be engineered with a different texture or coated in a hydrophilic material that tends to bond with water molecules. In some examples, texturing may be sufficient to form hydrophobic and/or hydrophilic portions without the need for additional coatings or materials (e.g., textures can achieve similar results as coatings). In this manner, the foreign material is guided away from the hydrophobic material and towards the hydrophilic material. Based on the location of the hydrophilic and hydrophobic materials, it may be possible to slow the ingress of the foreign material in the hearing assistance device.

The above example techniques may be performed together or separately. For example, a hearing assistance device may include one or more (e.g., subset) of magnetic material, an electro-magnetic field source, an internal energy source, and hydrophobic and/or hydrophilic material but not all of magnetic material, an electro-magnetic field source, an internal energy source, and hydrophobic and/or hydrophilic material. In some examples, the hearing assistance device may include all of magnetic material, an electro-magnetic field source, an internal energy source, and hydrophobic and hydrophilic material. In some examples, the magnetic material may be part of the hydrophobic or hydrophilic material.

Moreover, the above examples are described with respect to the tube of the hearing assistance device, but the example techniques are not so limited. The example techniques may be applied to other parts of the hearing assistance device. For example, the hydrophobic and/or hydrophilic material may be used in the tube and/or in the body of the hearing assistance device.

Although described primarily from the perspective of hearing assistance devices or hearing assistance systems, the described techniques are applicable to other types of "hearables." For example, the described techniques are applicable to a hearing assistance device, a hearing instrument, a hearing aid, a personal sound amplification product (PSAP), a headphone set, an earbud, a wireless ear-bud, or other hearing instrument that provides sound to a user for hearing.

Figure 1B:
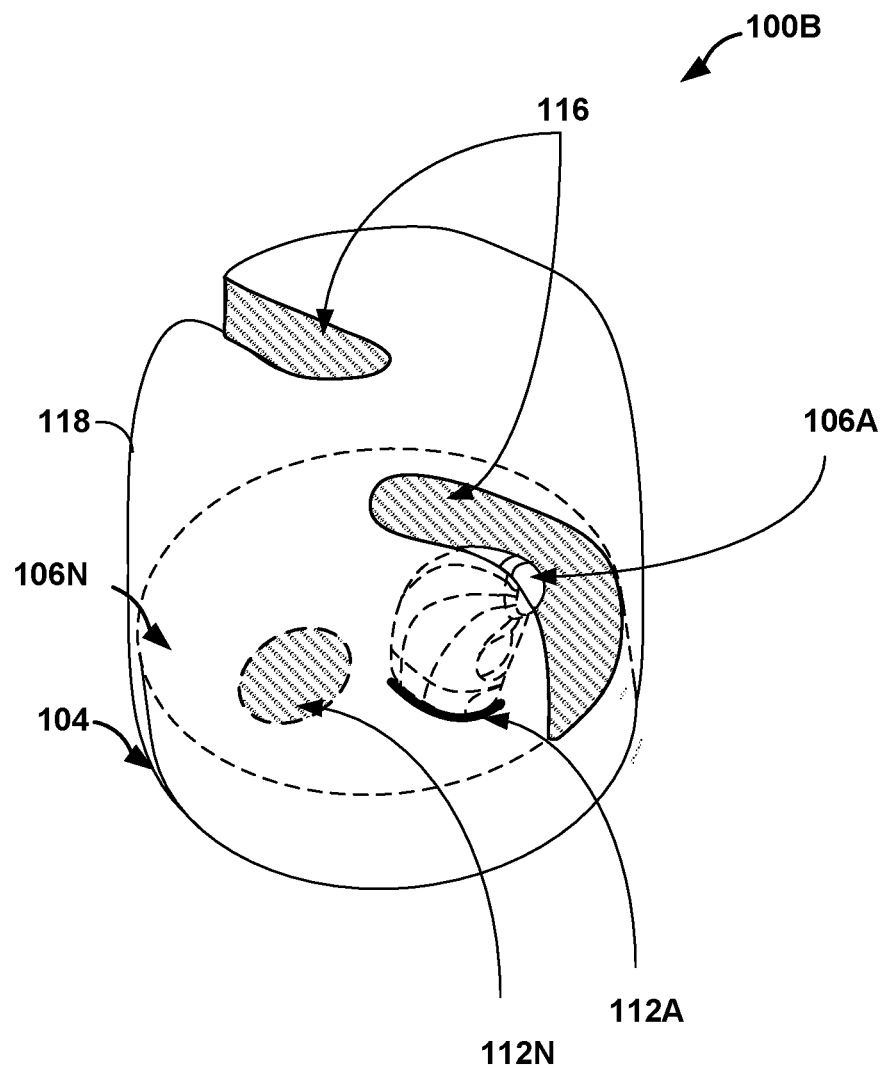
Figure 1C:
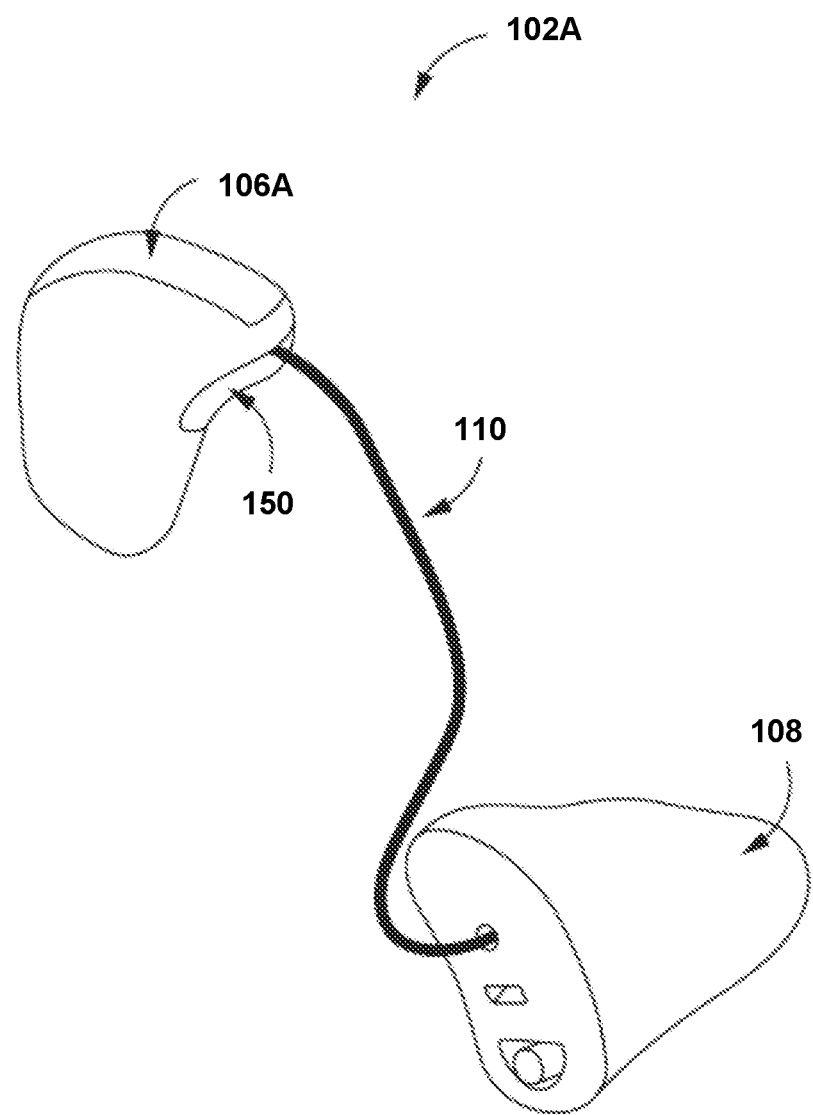
Figure 1D:
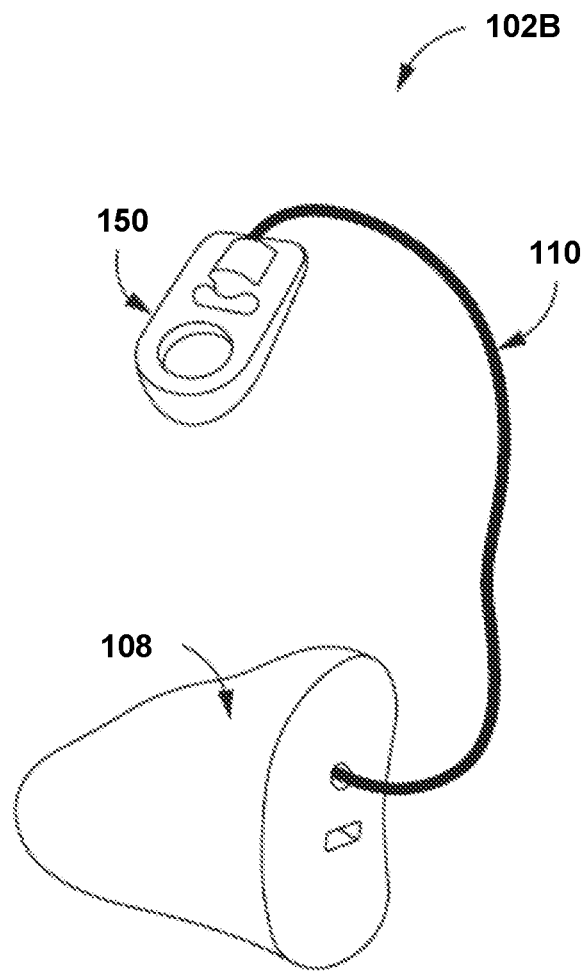

FIGS. 1A through 1D are conceptual diagrams illustrating an example hearing assistance system, in accordance with one or more aspects of the present disclosure. FIG. 1A shows an example of system 100A which includes portable case 104 and hearing assistance device 102 (referred to simply as "HAD 102"). FIG. 1B shows an example of system 100B, as an alternate view of system 100A, after tube 110 has been detached from behind-ear portion 106A. FIG. 1C shows HAD 102A as an example of HAD 100 from FIGS. 1A and 1B. HAD 102A includes behind-ear portion 106A, tube 110, and in-ear portion 108. FIG. 1D shows HAD 102B as an example of HAD 100 from FIGS. 1A and 1B. HAD 102B omits behind-ear portion 106A and includes only tube 110 and in-ear portion 108.

In the example of FIG. 1A, HAD 102 includes behind-ear portion 106A coupled to in-ear portion 108 via tube 110. Behind-ear portion 106A of HAD 102 is housed in a retention structure of portable case 104, for example, either to be subsequently detached from tube 110 for charging, or to be removed from portable case 104 via tube 110 to be worn by a user. In addition to storing (and in some instances charging) behind-ear portion 106A, portable case 104 also may charge one or more other behind ear portions. For example, in FIG. 1A, portable case 104 is also shown storing and/or charging behind ear portions 106B and 106N.

In FIG. 1B, tube 110 and in-ear portion 108 have been detached from behind-ear portion 106A. With tube 110 and in-ear portion 108 removed, FIG. 1B shows openings 116 in cover 118 of portable case 104, which are included in cover 118 to enable insertion and removal of behind-ear portions 106A, B, and N. Also identified in FIG. 1B are retention structures 112A and 112N; each of retention structures 112A and 112N is configured to retain one of behind-ear portions

106. As one example, retention structure 112N is empty and retention structure 112A includes behind-ear portion 106A.

In the examples of each of FIGS. 1A and 1B, portable case 104 is configured in a carousel arrangement to facilitate quick and easy exchange of one behind-ear portion 106 for a different behind-ear portion 106. In other examples, portable case 104 may be configured in a linear or other such arrangement.

A user may manipulate cover 118 of portable case 104 to expose, via openings 116, an individual retention structure 112 or multiple retention structures 112 at a time (e.g., to retrieve a pair of behind-ear portions 106). For example, a user may manipulate cover 118 to expose, via one of openings 116, retention structure 112A (which is empty at the time). Next, the user may insert behind-ear portion 106A into retention structure 112A and detach behind-ear portion 106A from tube 110. The user may then manipulate cover 118 to cover retention structure 112A and expose, via one of openings 116, retention structure 112N. Finally, the user may attach behind-ear portion 106N to tube 110 and remove behind-ear portion 106N from retention structure 112N.

Although primarily described as being a rotary type cover (e.g., similar to that which may be used for some types of fishing tackle containers such as rotary slip shot sinker containers), cover 118 may be a hinge type cover (e.g., similar to a typical dental floss container lid) configured to flip up and down to open and close. Alternatively, cover 118 may be configured to slide to open and close. Cover 118 may be configured to reveal two or more retention structures 112 at a time (e.g., via openings 116) so multiple behind-ear portions 106 could be changed without further manipulation of cover 118. Likewise, cover 118 may be configured to reveal a single one of retention structures 112 at a time or more than two retention structures 112 at a time.

FIG. 1C shows an example of HAD 102A which includes behind-ear portion 106A, tube 110, and in-ear portion 108. FIG. 1D shows an example of HAD 102B omitting behind-ear portion 106A and including only tube 110 and in-ear portion 108.

Various attachment features can be used to attach behind-ear portion 106A to portable case 104 and to attach behind-ear portion 106A to tube 110. The various attachment features may include mechanical and/or magnetic components that enable easy (e.g., one-handed) exchange of behind-ear portion 106A to and from portable case 104 and to and from tube 110.

For example, as shown in FIGS. 1C and 1D, tube 110 includes attachment feature 150 (also referred to as "coupling feature 150"). Attachment feature 150 is configured to mate with an attachment feature of behind-ear portion 106A. When detached from attachment feature 150, the attachment feature of behind-ear portion 106A is configured to mate with one of retention structures 112. Such attachment features may include mechanical and/or magnetic components that enable tube 110 and behind-ear portion 106A to maintain a strong physical bond when being worn, enable retention structures 112 and behind-ear portion 106A to maintain a strong physical bond when behind-ear portion 106A is charging. Such mechanical and/or magnetic attachment features may further enable behind-ear portion 106A to quickly disconnect from retention structures 112 and tube 110.

In some examples, a mechanical catch may prevent two parts from being detached without sufficient force for overcoming the mechanical catch. And, in the case of a magnetic feature, the attachment features may be a mechanically and/or magnetically self-aligning design. That is, to configure behind-ear portion 106A for use, a user may simply bring attachment feature 150 near an attachment area of behind-ear portion 106A and the magnetic attraction between attachment feature 150 and the attachment area of behind-ear portion 106A may force the two parts together and enable an electrical connection between the two parts. Similarly, to configure behind-ear portion 106A for storage or charging in portable case 104, a user may simply position the attachment area of behind-ear portion 106A above an empty one of retention structures 112, and the magnetic attraction between the empty retention structure 112 and the attachment area of behind-ear portion 106A may allow a user to simply drop behind-ear portion 106A into the empty retention structure 112 where the electrical contacts of behind-ear portion 106A may automatically align with the charging contacts of the empty one of retention structures 112.

In some cases, the mechanical and/or magnetic attachment features described above enable release of their bonds via rotation. That is, with both portable case 104, behind-ear portions 106, and attachment feature 150 of tube 110 having magnets or mechanical catches, the magnets and/or mechanical catches can be configured so that after two parts are physically mated together, a ninety-degree rotation of either part may cause the magnetic attraction to switch to magnetic repulsion or may cause the mechanical catch to be bypassed, thereby releasing one part from the other. For example, to remove behind-ear portion 106A from portable case 104, a user can simply turn either part, e.g., ninety degrees, to cause behind-ear portion 106A to pop out of case 104; to detach behind-ear portion 106A from tube 110, a user can simply turn either part, e.g., ninety degrees, to cause behind-ear portion 106A to separate from tube 110.

The attachment features described above may be improved via an electro-permanent magnetic catch. For example, portable case 104 may include circuitry to cause electro-permanent magnets in retention structure 112A to have a greater amount of magnetic attraction to behind-ear portion 106A when charging to prevent a user from separating the two parts prematurely. When behind-ear portion 106A is charged, portable case 104 may activate circuitry to switch the electro-permanent magnet of retention structure 112A to reduce the magnetic attraction between the two parts and enable mechanical disengagement of the charged behind-ear portion 106A with minimal force. Similar electro-permanent magnets may be used in tube 110 for varying the magnetic attraction between attachment feature 150 and behind-ear portion 106A depending on whether the parts are being mated together or separated.

Tube 110 provides a mechanism to connect in-ear portion 108 and behind-ear portion 106A. For example, behind-ear portion 106A includes a microphone, amplifier, and receiver (also called speaker). The microphone captures sound and converts the sound into electrical signals. The amplifier amplifies the electrical signals, and possibly performs some filtering operations. The speaker receives the amplified electrical signals and generates sound waves through tube 110 into in-ear portion 108.

Tube 110 may also provide an inlet for foreign material that can enter and travel to behind-ear portion 106A and cover the receiver (also called speaker) within behind-ear portion 106A. The foreign material may also clog tube 110 reducing the amount of sound waves that enter the ear canal. Examples of the foreign material include sweat and cerumen (earwax). For example, sweat and/or cerumen may gather within the ear and travel through tube 110 to the receiver within behind-ear portion 106A. The foreign material may cover the receiver and negatively impact sound traveling to the ear canal through in-ear portion 108.

The above description is described with respect to a receiver in canal (RIC) or behind-the-ear (BTE) configuration. However, the example techniques described in this disclosure are applicable to other examples of hearing assistance devices. For example, the example techniques are applicable to invisible in canal (IIC), completely in canal (CIC), mini in canal (MIC), microphone in helix (MIH), and in the ear (ITE) hearing aids as a few examples.

In general, the example techniques are applicable to examples where a hearing assistance device includes an enclosing structure configured to house a receiver that generates sound waves into an ear canal of a user. The receiver may be in the behind-ear portion 106A, or in the enclosing structure of the IIC, CIC, MIC, MIH, or ITE. For IIC, CIC, MIC, MIH, or ITE, there may not be a tube as large as tube 110. However, for IIC, CIC, MIH, or ITE, there is some structure through which sound waves travel into the ear canal of the user. The example techniques described in this disclosure for tube 110 are applicable to the structures through which sound travels in hearing assistance devices other than a BTE. That is, tube 110 and the structure through which sound waves travel into the ear canal of a user in IIC, CIC, MIC, MIH, or ITE are all examples of a tube coupled to the receiver to direct sound waves into the ear canal of the user. For ease of description, the examples are described with respect to tube 110, but the techniques are applicable to other types of tubes for other hearing assistance devices (e.g., techniques are applicable to structures in hearing assistance devices through which sound waves travel into the ear canal of the user).

As described above, foreign material such as sweat or cerumen can clog tube 110 or deposit on the receiver, thereby impacting the operation of the hearing assistance device. For example, water, sodium, and potassium in tube 110 can impact the operation of the hearing assistance device. The above examples of foreign material entering or forming in tube 110 are non-limiting and the example techniques described in this disclosure are applicable to other example ways in which foreign material may ingress into tube 110.

One commonality of the example foreign material is the inclusion of water. The example techniques described in this disclosure may exploit the chemical properties of water to condition the foreign material or the tube such that ingress of the foreign material through the tube is slowed and potentially to condition the foreign material or the tube such that the foreign material can be more easily expelled from the tube. For example, the techniques described in this disclosure may utilize magnetic fields and/or hydrophobic and hydrophilic materials (e.g., coatings) to slow down or expel foreign material from the tube. In examples where magnetic fields are utilized, this disclosure describes example techniques that utilize sufficiently low-level magnetic fields to slow down or expel foreign material while ensuring no impact to the hearing of the patient. Existing techniques may not have been based on the properties of the foreign material, like cerumen or sweat, that allow magnetic fields to slow down or expel such foreign material from the tube.

For example, water is a diamagnetic material, and tends to flow through paths where magnetic field levels are minimized. In some examples, tube 110 may be formed with magnetized materials that generate a magnetic field through tube 110. The magnetic field through tube 110 may then slow the ingress of the foreign material in tube 110 and reduce the chances of the foreign material clogging tube 110 or the foreign material reaching behind-ear portion 106A.

As another example, tube 110 may be formed with at least one hydrophilic coating and at least one hydrophobic coating. The hydrophilic coating attracts (e.g., pulls) water and hydrophobic coating repels water. By using a combination of a hydrophilic coating and a hydrophobic coating, it may be possible to move the foreign material in a particular location or direction so that the foreign material can be easily removed such as when tube 110 is removed for manual cleaning.

In some examples, the hydrophobic and/or hydrophilic coatings may be applied to behind-ear portion 106A or in-ear portion 108 to direct the foreign material in a particular direction or to restrict foreign material from entering behind-ear portion 106A and/or in-ear portion 108. For example, behind-ear portion 106A may be formed with a plurality of segments that are sealed. Even though the plurality of segments are sealed, there is a possibility of water entering through the seam created from connecting the segments. By applying a hydrophobic coating at the seam between the segments, there is a reduction in the chances of water entering through the seam.

Using magnetized materials in tube 110 and using a hydrophobic and/or hydrophilic coating are two example ways in which ingress of foreign material can be slowed (e.g., with magnetized materials in tube 110) or controlled (e.g., with hydrophobic and/or hydrophilic coating). In some examples, behind-ear portion 106A and/or in-ear portion 108 (e.g., such as in examples where the hearing assistance device is an IIC, CIC, MIC, or ITC) includes a drive circuit and a coiled wire. The drive circuit outputs an alternating current through the coiled wire that causes the coiled wire to radiate an electro-magnetic field.

The drive circuit and the coiled wire may be within behind-ear portion 106A and near the receiver. The coiled wire may be external to tube 110. In some examples, the drive circuit may be within behind-ear portion 106A and the coiled wire may be coiled around tube 110 (e.g., encircling tube 110).

As described above, the water molecule is a dipole, and therefore, in the presence of a magnetic field, the water molecules reorient in a manner that changes the cohesive properties of the water molecules. With the current flowing through the coil, the resulting magnetic field may cause the foreign material to orient such that the foreign material is less likely to stick to the inside of tube 110.

The user may periodically and manually clean tube 110. By reducing the cohesiveness of the foreign material (e.g., through the application of an electro-magnetic field), by directing foreign material in a particular direction or location (e.g., through hydrophobic and/or hydrophilic coatings), and/or by reducing the amount of foreign material that ingresses into tube 110 (e.g., by including magnetized material in tube 110), the user may be able to more easily clean tube 110. For example, the foreign material may be positioned such that there is a reduction in the amount of effort that the user needs to expend to clean tube 110.

There may be other ways in which to clean tube 110. As one example, behind-ear portion 106A and/or in-ear portion 108 (e.g., such as in examples where the hearing assistance device is an IIC, CIC, MIC, or ITC) includes an energy source that can be used to expel the foreign material from tube 110. One example of the energy source is a mechanical vibrating component that vibrates tube 110 can dislodges the foreign material. Another example of the energy source may be the receiver itself that is designed to generate an inaudible signal that pushes the foreign material through tube 110. In some examples, such as by the inaudible signal vibrating tube 110 or by the inaudible signal pushing foreign material, the foreign material may travel towards the user's ear canal. However, the amount of foreign material may be sufficiently small that pushing the foreign material towards the user's ear canal does not cause any negative impact to the user (e.g., damage or discomfort).

Figure 2:
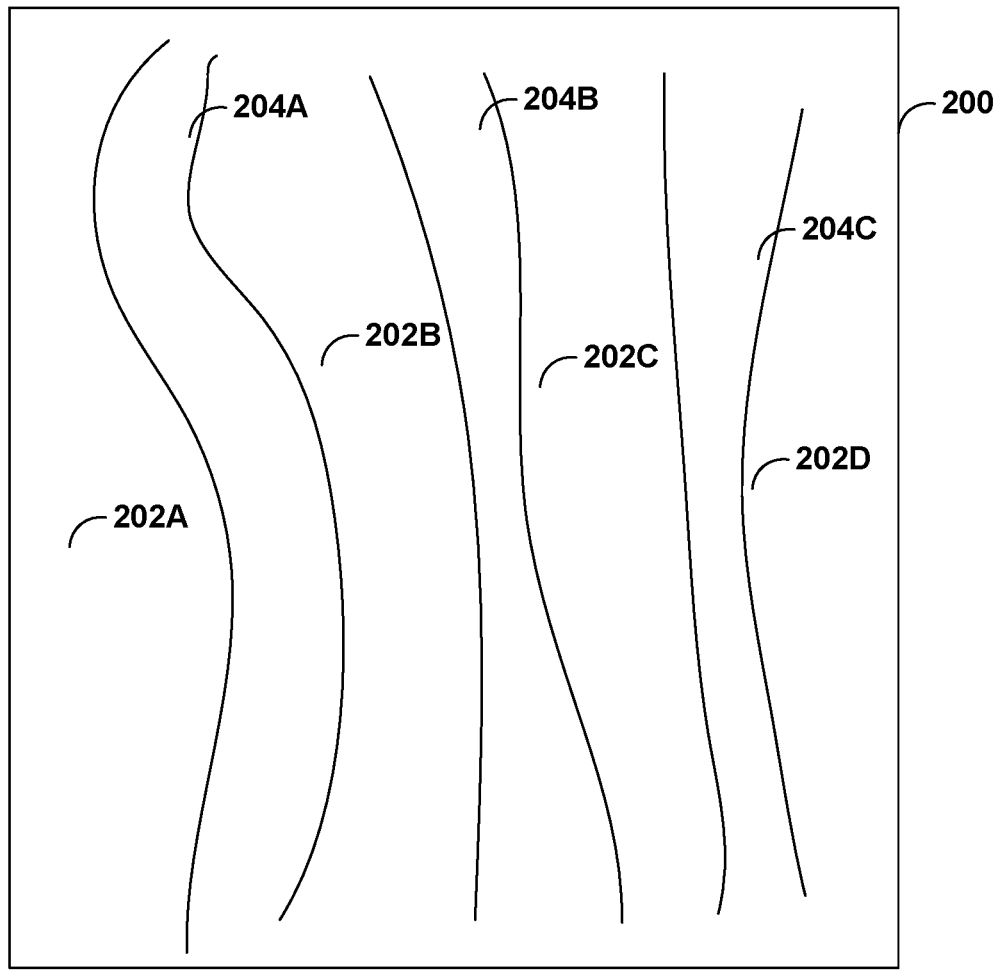
FIG. 2 is a conceptual diagram illustrating an example of a surface of a tube of a hearing assistance device having at least one of hydrophobic and hydrophilic layers.

FIG. 2 is a conceptual diagram illustrating an example of a surface of a tube of a hearing assistance device having at least one of hydrophobic and hydrophilic layers. For example, FIG. 2 illustrates surface 200. One example of surface 200 is tube 110 folded open to form a rectangular surface. Surface 200 may be an inner surface of tube 110 after tube 110 is folded open.

Surface 200 may be formed with at least one of hydrophobic and hydrophilic coatings. For example, surface 200 may include a portion of a hydrophilic coating and a portion of a hydrophobic coating. As one example, the hydrophilic coating can be a material such as Grilamid TR55-LX which has a surface energy contact angle of less than 90 degrees, anti-fog from Rain X, FluoroPel 800 from the company Cytonix for hydrophilic and hydrophobic coatings and bare Grilamid. Acetic acid (HAc) coating can be used for the hydrophobic coating as well.

Various design choices may be available when including hydrophobic or hydrophilic portions. The surface area of each coating may only be limited to the application method. The portions could be strips vertical, horizontal, flat, inside between or outside of the device from 0.025 inches to complete coverage of the surface. The geometry and orientation of the geometry should be taken in consideration and what is near that which is protected from the foreign material. A hydrophilic coating near electronics on a vertical surface would draw moisture from the air and condensate on the surface first and could be channeled by geometric texturing to another place with another kind of surface texture that has a hydrophobic coating to move the moisture from that area. The areas of each coating may be a factor in hydrophilic or hydrophobic coatings.

As one example, as illustrated in FIG. 2, surface 200 includes a plurality of strips 202A-202D and a plurality of strips 204A-204C. Strips 202A-202D are one example of the portion of hydrophobic coating. Strips 204A-204C are one example of the portion of hydrophilic coating. As illustrated, in some examples, strips 204A-204C of hydrophilic coating are interleaved with strips 202A-202D of hydrophobic coating. In some examples, strips 204A-204C of hydrophilic coating interleaved with strips 202A-202D of hydrophobic coating form a helix shape.

Also, although surface 200 is described as being part to tube 110, the example techniques are not so limited. In some examples, surface 200 may represent the inner portion of the enclosing structure (e.g., behind-ear portion 106A for BTE hearing assistance devices or in-ear portion 108 for IIC, MIC, ITE, CIC hearing assistance devices) that houses the receiver that transmits sound waves through tube 110. In other words, the enclosing structure that includes the receiver may include a portion of hydrophilic coating and a portion of hydrophobic coating.

In some examples, surface 200 is a textured surface. For example, rather than being a smooth surface, surface 200 may include bumps and grooves. As a few examples, the textured surfaces may include V-Grooves, Simi-spheres, bumps and cones as a few typical geometry cuts and speed of the cutting tools leave tool marks. In some examples, water droplets may stick to the textured areas. When hydrophobic surface treatment is added to the textured area, the droplets may bounce off the textured area, which increases the sliding effect of the water droplets. When hydrophilic surface coating is applied to the textured area, the droplets may adhere to the surface with greater surface tension. This process amplified the coating that is applied to the textured surface. On example of the texture that is added to the chip is peaks of 0.0054" spread apart at 0.0028".

Accordingly, this disclosure describes examples of a hearing assistance device that includes an enclosing structure configured to house a receiver that generates sound waves into an ear canal of a user when the hearing assistance device is worn. Examples of the enclosing structure include behind-ear portion 106A for BTE or in-ear portion 108 for IIC, CIC, MIC, MIH, or ITE.

The hearing assistance device also includes a tube (e.g., surface 200 when surface 200 is folded back to make tube 110) coupled to the receiver to direct the sound waves into the ear canal of the user. The tube (e.g., surface 200) comprises a portion of hydrophilic coating (e.g., strips 204A-204C) and a portion of hydrophobic coating (e.g., strips 202A-202D).

Figure 3D:
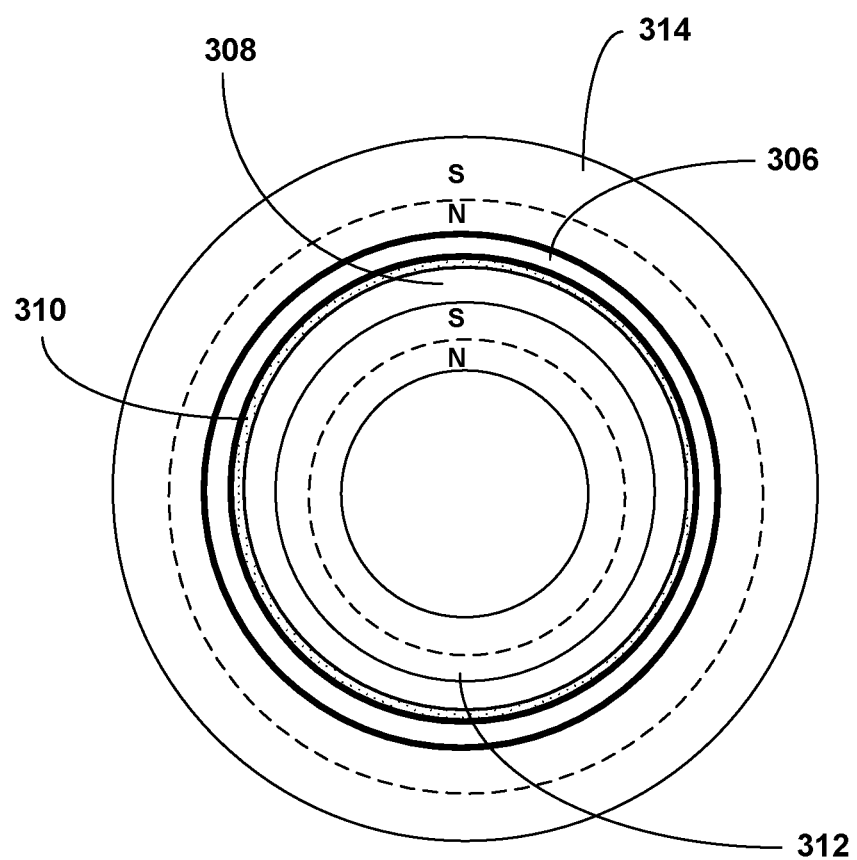

FIGS. 3A-3D are conceptual diagrams illustrating different perspectives of a tube of a hearing assistance device having magnetized particles. For instance, FIGS. 3A-3C illustrate tube 300 and FIG. 3D illustrates tube 306. Tubes 300 and 306 may be substantially similar, including identical, to tube 110 or the tube formed by folding back surface 200.

As illustrated in FIGS. 3A-3C, tube 300 include particles 302A-302N. Particles 302A-302N may be dispersed randomly throughout the volume formed between the external and internal surfaces of tube 300. In some examples, particles 302A-302N may be arranged in a particular pattern with a particular placement. The shape of particles 302A-320N may be approximately spherical, and the size of particles 302A-302N may be approximately 65 $\mu m^3$ (e.g., 5 μm diameter sphere). Particles 302A-302N may occupy approximately 5% to 50% of volume between the external and internal surfaces of tube 300.

Examples of particles 302A-302N include permanent magnetic material (e.g., ferromagnetic and ferrimagnetic materials). In some examples, particles 302A-302N may be magnetic microspheres, such as colloidal magnetic silica microspheres. In such examples, particles 302A-302N may have the property that once magnetized, particles 302A-302N remain magnetized.

The following are some examples of magnetic microspheres. For instance, various combinations of the elements iron (Fe), nickel (Ni), cobalt (Co) and gadolinium (Gd) are materials that may be used to form magnetic microspheres, including iron oxides. The combination of these metals has direct influence of the H field, which represents the magnetic field strength. These material combinations also influence the B field, which represents is the density of the magnetic field. These material combinations are considered ferromagnetic and will retain or not lose the field once the applied field is removed. As one example, a mix of chromium dioxide with the iron oxide may cause the combination to retain the magnetic field once the applied magnetic field is removed. The material could be used to manufacture parts that work with one or more, including all, examples described in this disclosure. The particle size of the material is 2 to 120 nanometers. The mix of chromium dioxide with the iron oxide may work in CFM-20-10 SPHERO™ Carboxyl Ferromagnetic Particles.

In general, most materials, including possibly any material, that remains ferromagnetic after being subjected to a magnetic field may be used as a magnetic microsphere. The types of materials that may not work as well are classified as paramagnetic (i.e., they react to a magnetic field but do not remain magnetic when that field is removed).

In some examples, a silica coating may be applied to the magnetic microspheres, which may offer processing ease, but such coating is not necessary. Chromium Dioxide may be added to the magnetic microspheres. In general, magnetic powder such as powders used to make neodymium magnets may be used in addition to or instead of magnetic microspheres. The smaller the powder (e.g., the more crushed) the less magnetism it has, and may be one way to impart a magnetic field with flux lines relatively perpendicular to the surface of debris ingress. In some examples, dependent on the degree of surface roughness, perpendicular may be a relative term to the degree of slope of the texture to the direction of ingress. If surface roughness depth is 0.0035" and the peak to peak width is 0.004," the flux lines may be normal or orthogonal to the 59.490 degrees slope of the surface roughness.

Accordingly, in some examples, the magnetic microspheres are mixed within an injection-molded or injection-moldable material. When the injection-molded or moldable material is cured from a liquid state to solid within vicinity of a magnet to form an injection-molded part, the microspheres are aligned per the magnetic field from the magnet.

There may be other ways in which to include microspheres as particles 302A-302N in tube 300. For instance, in some cases, microspheres can be wasted in the vents of the molding tool when the magnetic microspheres are mixed with injection-molded material and injected into tube 300. The microspheres may be expensive, and the wasted microspheres may result in unneeded extra costs. Also, in the examples where the microspheres are mixed with an injection-molded or moldable material and injected into tube 300, it may be difficult to corral the microspheres to a particular region since the microspheres are pre-mixed and uniformly distributed throughout the injection resin (e.g., injection-molded material).

In some examples, rather than or in addition to using injection-molded or moldable material for including microspheres in tube 300 as particles 302A-302N, a coating process may be utilized. For example, the injection-molded or moldable material is used to create a substrate and the substrate is cured (e.g., the substrate is injection molded and cured).

In the coating process, the cured part (e.g., substrate) is coated with a coating material includes one or more solvents and microspheres. In some examples, the coating may include hydrophobic, hydrophilic, and/or oleophobic (e.g., oil repellent) polymers and/or elastomers together with the one or more solvents and microspheres. After the coating is applied (e.g., brushed, dipped, sprayed, or any other application), the one or more solvents may flash off (e.g., flash cure) leaving the coating material and the microspheres (e.g., the hydrophobic, hydrophilic, and/or oleophobic polymers and/or elastomers and the microspheres may remain). Inclusion of the hydrophobic, hydrophilic, and/or oleophobic polymers and/or elastomers is not necessary in all examples. In this way, the one or more solvents may be removed as part of curing the coating. There may be various ways in which to "flash off" the one or more solvents such as by heat, evaporation, and the like. An example of magnetic materials being included in the coating material is illustrated in FIG. 3D.

The coating material may cross-link with the substrate, and during this cross-linking stage, an external magnetic field may be applied to align the microspheres. That is, the one or more solvents allow the hydrophobic, hydrophilic, and/or oleophobic polymers and/or elastomers to cross-link with the substrate, and the microspheres are aligned during this cross-linking phase. The cross-linking phase may be a UV (ultra-violet) curing step but use external magnetic field. The result of applying the external magnetic field may be a thin material coating of cross-linked microspheres. Similar to above, these microspheres retain their magnetic properties and interact with the cerumen, keeping the cerumen from processing over a distance, etc. In some examples, the coating material, once the one or more solvents has flashed off, may be based on hydrophobic and/or hydrophilic compounds (e.g., including the hydrophobic, hydrophilic, and/or oleophobic polymers and/or elastomers).

A result of utilizing the coating process described above with a hydrophobic and/or hydrophilic compound may be that the coating is more likely to stay on tube 300 as compared to other techniques of including hydrophobic and/or hydrophilic coating. For instance, some other types of hydrophobic coatings may lack toughness and can easily scrape off of tube 300.

In some examples, the injection-molded/moldable material may include polymers and/or elastomers in addition to the microspheres. The polymers and/or elastomers give the material hydrophilic, hydrophobic, and/or oleophobic properties such that when the solvent is flashed off, the remaining coating may be hydrophilic, hydrophobic, and/or oleophobic, and when a magnetic field is applied, the microspheres become magnetic and retain their magnetism to slow or stop the movement of cerumen, as described above.

In some examples, particles 302A-302N may be droplets of magnetic fluid. Rather than having droplets of magnetic fluid, it may be possible for tube 300 to be filled with (partially or fully) magnetic fluid. Magnetic fluid may be similar to ferrofluid that becomes magnetic in the presence of a magnetic field. However, the magnetic fluid maintains its magnetism even after removal of the magnetic field. The magnetic fluid may include ferromagnetic nanoparticles suspended in fluid. The magnetic field may utilize iron oxide nanoparticles. In some examples, the magnetic fluid may be formed with injecting water into a tube of silicone oil mixed with a nanoparticle surfactant that forms an elastic film. The iron oxide nanoparticles may form a shell at the interface between the water droplets and the oil suspension. Examples of the magnetic fluid are described in https://www-.sciencealert.com/scientists-have-printed-droplets-of-permanently-magnetic-liquid-and-boy-is-it-trippy.

As illustrated in FIG. 3B, tube 300 temporarily includes magnets 304A-304N during the molding process (e.g., a pin used during injection molding), where every other magnet is orthogonal to the previous and subsequent magnet. This orientation of magnets 304A-304N magnetizes and/or aligns previously-magnetized particles 302A-302N. For example, particles 302A-302N align and then the injection molding material cures into an elastomer or plastic. Other orientations of magnets 304A-304N are possible. Once magnetized, particles 302A-302N form a magnetic field around tube 300. In some examples, the magnetic field created by particles 302A-302N at a location along the surface of the conduit is approximately within a range of 100 nanoTesla to 100 micro Tesla.

As illustrated in FIG. 3C, tube 300 may temporarily include cylindrical magnets arranged with a common axis.

As illustrated, the cylindrical magnets may alternate between N/S alignment. FIG. 3C illustrates the magnets with an oblique visual angle.

As described above, due to the diamagnetic properties of water, water tends not to flow through areas having a magnetic field. Therefore, the magnetic field formed by magnetized particles 302A-302N slows ingress of a foreign material having water through tube 300 when the hearing assistance device is worn.

FIG. 3D illustrates tube 306, which includes conduit internal coating 310 with magnetic material, such as magnetized particles 302A-302N. In FIG. 3D, tube 306 is shown with bolded lines to distinguish the components illustrated in FIG. 3D. For example, between the bolded lines of tube 306 is the volume formed between the external and internal surfaces of tube 306.

Coating 310 is referred to as a conduit internal coating because coating 310 may be on an internal surface of tube 306. For example, tube 306 forms conduit 308 that is surrounded by the internal surface of tube 306. As described above, in some examples, coating 310 may be hydrophobic, hydrophilic, or oleophobic coating. The magnetic material, such as magnetized particles 302A-302N, may be within the hydrophobic, hydrophilic, or oleophobic coating. That is, during the curing of coating 310 (e.g., due to heat or ultra-violet (UV)), the magnetic material remains cured on the internal surface of tube 306.

FIG. 3D also illustrates an example manner in which to magnetize the magnetic material in coating 310. As one example, radially magnetized ring magnet 312 may be placed inside conduit 308, with the south pole of ring magnet 312 proximate to the inner surface of tube 306 and the north pole of ring magnet distal from the inter surface of tube 306. Radially magnetized ring magnet 314 may be placed outside tube 306, which the north pole of ring magnet 314 proximate to the outer surface of tube 306 and the south pole of ring magnet 314 distal from the outer surface of tube 306.

The pole-orientation of ring magnets 312 and 314 is illustrated as one example and should not be considered limiting. Also, the use of ring magnets 312 and 314 to magnetize particles may also be utilized in examples where magnetic particles 302A-302N are within the volume formed between the external and internal surfaces of a tube, as illustrated in FIG. 3A. In some examples, it may be possible to magnetize the magnetic material in coating 310, in FIG. 3D, using the example techniques described above with respect to FIGS. 3B and 3C. Moreover, in the example illustrated in FIG. 3D, in addition to magnetic particles in coating 310, it may be possible to include magnetic particles 302A-302N throughout the volume formed between the external and internal surfaces of tube 306, similar to the example of FIG. 3A.

Accordingly, this disclosure describes examples of a hearing assistance device that includes an enclosing structure configured to house a receiver that generates sound waves into an ear canal of a user when the hearing assistance device is worn. Examples of the enclosing structure include behind-ear portion 106A for BTE or in-ear portion 108 for IIC, CIC, MIC, MIH, or ITE.

The hearing assistance device also includes a tube (e.g., tube 300) coupled to the receiver to direct the sound waves into the ear canal of the user. Tube 300 comprises magnetized particles 302A-302N that form a magnetic field through the tube 300. Tube 306 includes magnetized particles in coating 310 that form a magnetic field through tube 306.

Figure 4:
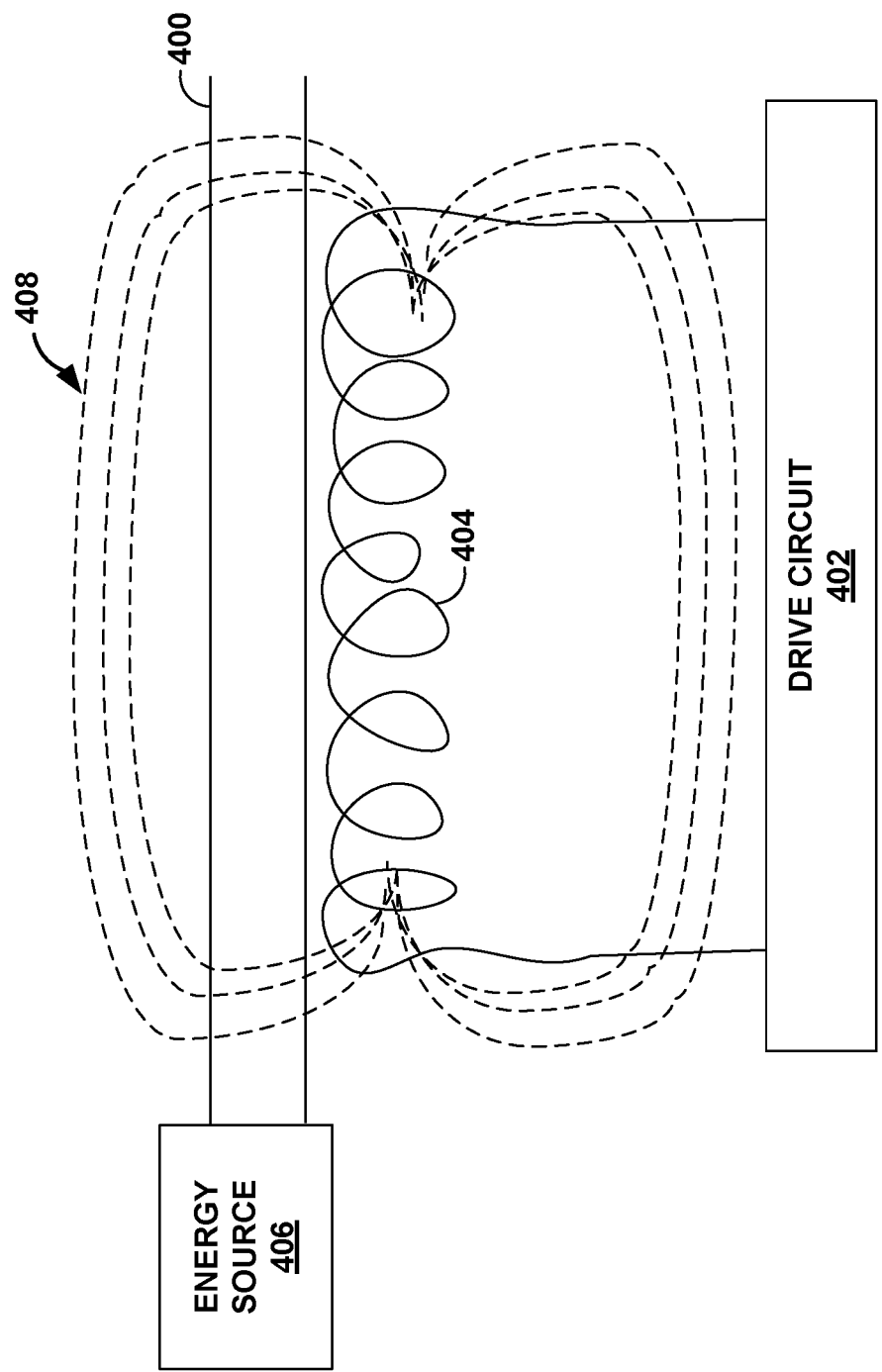
FIG. 4 is a block diagram illustrating an example of a tube of a hearing assistance device immersed in a magnetic field.

FIG. 4 is a block diagram illustrating an example of a tube of a hearing assistance device immersed in a magnetic field. FIG. 4 illustrates tube 400. Tube 400 may be substantially similar, including identical, to any one or combination of tubes 110, a tube having surface 200, tube 300, or tube 306 described above.

As illustrated in FIG. 4, the enclosing structure (e.g., behind-ear portion 106A for BTE or in-ear portion 108 for IIC, CIC, MIC, MIH, or ITE) includes drive circuit 402 and coiled wire 404. As illustrated, coiled wire 404 is external and not coupled to tube 400. Although shown as being below tube 400, in some examples, coiled wire 404 may be above tube 400 or at any other location generally proximate to tube 400.

Coiled wire 404 may be coiled around (e.g., encircle) a core external to tube 400. In FIG. 4, coiled wire 404 is coiled in air (e.g., the core is air); however, other types of cores may be used. As one example, the core may be silicon steel.

Drive circuit 402 may be configured to output an alternating current through coiled wire 404. For example, coiled wire 404 may be configured to carry any alternating current. The alternating current flowing through coiled wire 404 causes an electro-magnetic field 408 to emanate from coiled wire 404. In some examples, the amplitude of the alternating current is approximately in range of 200 mA to 500 mA such as when external to the user (e.g., on charging station) or approximately in range of 0.1 mA to 7 mA such as when the user is wearing the hearing assistance device.

In some examples, the amplitude of the alternating current may be based on various factors such as the rail voltage of drive circuit 402, the type of power converter (e.g., buck converter or charge pump) used by drive circuit 402, and the duty cycle of the current output by drive circuit 402. The rail voltage may be based on the type of battery used for drive circuit 402. For example, zinc air batteries provide 0.9 V to 1.3 V, lithium ion rechargeable batteries provide 1.2 V to 2.5 V, and in some examples, provide up to 3.6 V. The type of power converter may affect the peak electrical current and duty cycle before brown-out artifacts occur.

In some examples, the range of the amplitude may be 200 mA to 700 mA, over a 2 to 10 microsecond period, with a frequency of 0.2 Hz to 0.067 Hz (e.g., every 5 second to 15 second interval), such as 500 mA, over 5 microsecond period with a frequency of 0.1 Hz (e.g., every 10 second interval). Utilizing such example ranges for current amplitude and duration may allow jostling the ionic flow of the foreign material with a quick electromagnetic field and keep the foreign material from further ingress without applying a constant electrical current. The above ranges are provided merely as examples and should not be considered limiting. The range may be less than or greater than 200 mA to 700 mA, the duration of the current may be longer than or shorter than 2 to 10 microseconds, and the interval between which the current is delivered may be longer than or shorter than 5 to 15 seconds.

In some examples, the range of the amplitude of the current may be 0.1 mA to 7 mA, as described above. In such examples, the duration of the current may be from 2 to 10 microseconds, but may be longer or shorter as well. Also, the interval between which the current is delivered may be 5 to 15 seconds, but may be longer or shorter as well.

As described above, although water may flow through paths with reduced or no magnetic field, when water does enter a magnetic field, the dipole structure of water causes the water to reorient. For example, when the molecules reorient, this change makes the hydrogens turn parallel and perpendicular between magnetic and electromagnetic fields.

Since hearing assistance devices have gotten more complex with wireless and stronger digital signal processors (DSPs) and are already frequently in magnetic fields, modifying or making programs to run circuits like this to generate magnetic fields can be implemented in hearing assistance devices. In some examples, the creation of the magnetic field may be timed with a low frequency sound wave.

The result of the reorientation may be that the cohesive forces of the foreign material are reduced making it easier to expel the foreign material.

In some examples, energy source 406 may be used to expel the foreign material. Energy source 406 is not required in every example. In the example illustrated in FIG. 4, energy source 406, coiled wire 404, and drive circuit 402 are within the enclosing structure. Therefore, the foreign material, when expelled may enter the ear canal of the user. However, the amount of foreign material may not be sufficiently large to negatively impact the user.

As one example, energy source 406 may be a structure that generates a force to expel the foreign material from tube 400. For example, energy source 406 may generate a vibrating force that causes tube 400 to vibrate. The vibration causes the foreign material to vibrate and shake down towards the ear canal and out of tube 400. Another example of the force is an audio signal that pushes the foreign material. For instance, energy source 406 may be the receiver that generates an audio signal that is inaudible to the user but has sufficient force to move the foreign material. Energy source 406 may be configured to provide both vibration and audio signal that is inaudible, as two non-limiting examples of force, to expel the foreign material.

Figure 5:
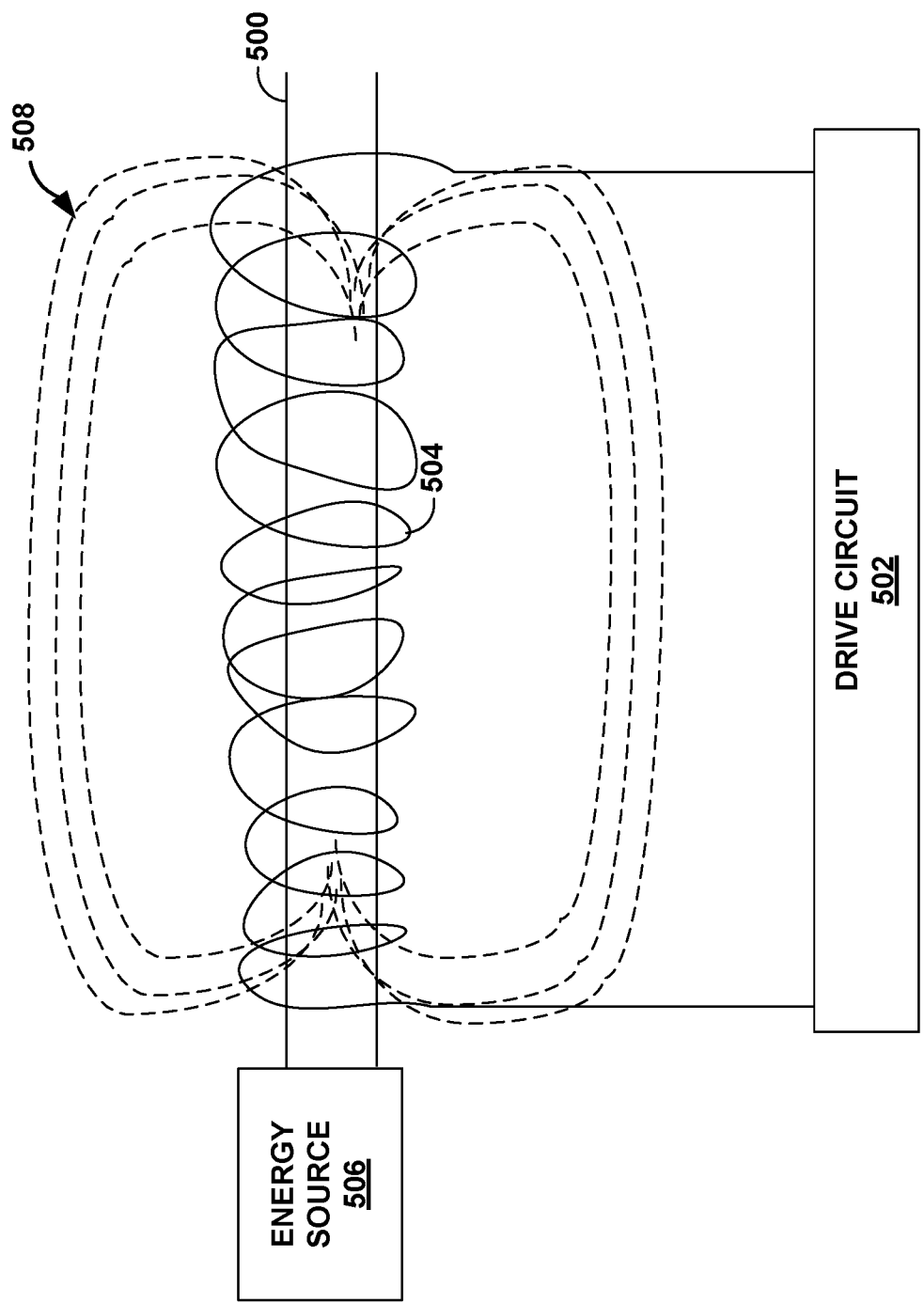
FIG. 5 is a block diagram illustrating another example of a tube of a hearing assistance device immersed in a magnetic field.

FIG. 5 is a block diagram illustrating another example of a tube of a hearing assistance device immersed in a magnetic field. FIG. 5 illustrates tube 500 which may be similar, including identical, to any one or combination of tube 110, a tube formed by surface 200, tube 300, or tube 400.

The example illustrated in FIG. 5 is similar to the example illustrated in FIG. 4, except coiled wire 504 is coiled around (e.g., encircles) tube 500, and in contrast, coiled wire 404 is external and separate from tube 400.

As illustrated in FIG. 5, the enclosing structure (e.g., behind-ear portion 106A for BTE or in-ear portion 108 for IIC, CIC, MIC, MIH, or ITE) include drive circuit 502 and coiled wire 504. Unlike coiled wire 404, coiled wire 504 may be coiled around tube 500.

Drive circuit 502 may be configured to output an alternating current through coiled wire 504. For example, coiled wire 504 may be configured to carry an alternating current. The alternating current flowing through coiled wire 504 causes an electro-magnetic field 508 to emanate from coiled wire 504. In some examples, the amplitude of the alternating current is approximately in range of 200 mA to 500 mA such as when external to the user (e.g., on charging station) or approximately in range of 0.1 mA to 7 mA such as when the user is wearing the hearing assistance device. Similar to above, electro-magnetic field 508 may reorient the water molecules to reduce the cohesive forces of the foreign material.

In some examples, energy source 506 may be used to expel the foreign material. Energy source 506 is substantially similar, including identical, to energy source 406.

Accordingly, this disclosure describes examples of a hearing assistance device that includes an enclosing structure configured to house a receiver that generates sound waves into an ear canal of a user when the hearing assistance device is worn. Additionally, the hearing assistance device also includes a tube coupled to the receiver to direct the sound waves into the ear canal of the user. The hearing assistance device also includes a coiled wire (e.g., coiled wire 404 or 504) configured to carry an alternating current to generate an electro-magnetic field through tube 400 or 500.

FIGS. 1A-1D and 2-5 illustrate different examples of tubes that are used in hearing assistance devices and different configurations of hearing assistance devices. These examples may be implemented separately or in combination. For example, FIGS. 3A-3C illustrate tube 300 that includes magnetized particles 302A-302N that form a magnetic field through the tube (magnetic fluid may be used instead of or in addition to magnetized particles 302A-302N). FIG. 3D illustrates tube 306 that includes coating 310 having magnetized particles similar to (including same as) magnetized particles 302A-302N. In some examples, the internal surface of tube 300 or tube 306 may be the same as surface 200 of FIG. 2. However, the example techniques do not require the internal surface of tube 300 or tube 306 to be the same as surface 200.

As another example, the examples of FIG. 4 and/or FIG. 5 may be used in combination with the example of FIGS. 3A-3D. For instance, tube 400 or tube 500 may be formed in the same way as tube 300 or tube 306. However, the example techniques do not require tube 400 and tube 500 to be formed in the same way as tube 300 or tube 306.

As another example, tube 400 or tube 500 may include an internal surface similar to surface 200. However, the example techniques do not require tube 400 or tube 500 to include an internal surface similar to surface 200.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection may be considered a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transitory, tangible storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The invention claimed is:

1. A hearing assistance device comprising:
an enclosing structure configured to house a receiver that generates sound waves into an ear canal of a user when the hearing assistance device is worn; and
an acoustical conduit coupled to the receiver to direct the sound waves into the ear canal of the user, wherein an inner surface of the acoustical conduit comprises a portion of hydrophilic coating and a portion of hydrophobic coating.

2. The hearing assistance device of claim 1, further comprising:
a coiled wire configured to carry an alternating current to generate an electro-magnetic field.

3. The hearing assistance device of claim 2, wherein an amplitude of the alternating current is approximately one of:
in range of 0.1 mA to 7 mA; or
in range of 200 mA to 700 mA over a 2 to 10 microsecond period with a 5 to 15 second interval.

4. The hearing assistance device of claim 1, further comprising an energy source configured to vibrate the acoustical conduit or generate a force for dispelling a foreign material from the acoustical conduit.

5. The hearing assistance device of claim 1, wherein the portion of hydrophilic coating comprises a plurality of strips of the hydrophilic coating and the portion of hydrophobic coating comprises a plurality of strips of the hydrophobic coating.

6. The hearing assistance device of claim 5, wherein the plurality of strips of the hydrophilic coating are interleaved with the plurality of strips of the hydrophobic coating.

7. The hearing assistance device of claim 6 wherein the plurality of strips of the hydrophilic coating interleaved with the plurality of strips of the hydrophobic coating form a helix shape.

8. The hearing assistance device of claim 1, wherein the enclosing structure includes a portion of hydrophilic coating and a portion of hydrophobic coating.

9. The hearing assistance device of claim 1, wherein the inner surface of the acoustical conduit comprises a textured surface.

10. The hearing assistance device of claim 9, wherein the textured surface includes bumps or grooves.

11. The hearing assistance device of claim 10, wherein the bumps or grooves comprise at least one of V-grooves, semi-spheres, or cones.

12. The hearing assistance device of claim 9, wherein the hydrophobic coating is disposed on the texture surface.

13. The hearing assistance device of claim 9, wherein the hydrophilic coating is disposed on the textured surface.

14. The hearing assistance device of claim 2, wherein the coiled wire is coiled around the acoustical conduit.

15. The hearing assistance device of claim 2, wherein the coiled wire is coiled around a core external to the acoustical conduit.

16. The hearing assistance device of claim 1, further comprising an in-ear portion coupled to the receiver by the acoustical conduit.

17. The hearing assistance device of claim 16, further comprising at least one of a hydrophobic coating or a hydrophilic coating applied to the in-ear portion.

* * * * *